(12) United States Patent
Yu et al.

(10) Patent No.: US 11,432,237 B2
(45) Date of Patent: Aug. 30, 2022

(54) DRX CONFIGURATION METHOD, TERMINAL DEVICE, NETWORK DEVICE, AND COMMUNICATIONS SYSTEM

(71) Applicant: HUAWEI TECHNOLOGIES CO., LTD., Guangdong (CN)

(72) Inventors: Haifeng Yu, Beijing (CN); Xin Xiong, Beijing (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 177 days.

(21) Appl. No.: 16/714,402

(22) Filed: Dec. 13, 2019

(65) Prior Publication Data

US 2020/0120596 A1    Apr. 16, 2020

Related U.S. Application Data

(63) Continuation of application No. PCT/CN2018/091494, filed on Jun. 15, 2018.

(30) Foreign Application Priority Data

Jun. 16, 2017    (CN) .......................... 201710459796.0

(51) Int. Cl.
*H04W 72/04* (2009.01)
*H04W 76/28* (2018.01)
(Continued)

(52) U.S. Cl.
CPC ....... *H04W 52/0203* (2013.01); *H04W 72/04* (2013.01); *H04W 72/085* (2013.01); *H04W 76/28* (2018.02)

(58) Field of Classification Search
CPC . H04W 76/28; H04W 52/0203; H04W 72/04; H04W 72/085; H04W 52/0219;
(Continued)

(56) References Cited

U.S. PATENT DOCUMENTS 8,937,895 B2 * 1/2015 Xu .................. H04L 5/0044
370/335
9,066,261 B2 * 6/2015 Ji .................... H04W 24/10
(Continued)

FOREIGN PATENT DOCUMENTS

CN    101827426 A    9/2010
CN    101841823 A    9/2010
(Continued)

*Primary Examiner* — Ahmed Elallam
(74) *Attorney, Agent, or Firm* — Womble Bond Dickinson (US) LLP

(57) ABSTRACT

This application provides a DRX configuration method, a terminal device, a network device, and a communications system. The DRX configuration method includes: receiving, by a terminal device, N discontinuous reception DRX configurations sent by a network device, where the N DRX configurations respectively correspond to N groups of carriers; and when a DRX status of the terminal device is an active state, if M groups of carriers in the N groups of carriers are activated carriers, monitoring, by the terminal device, a physical downlink control channel on a specified carrier based on M DRX configurations corresponding to the M groups of carriers. In the DRX configuration manner, the terminal device simultaneously uses a plurality of DRX configurations in an overlay manner, thereby meeting quality of service requirements of different services sent by the terminal device. In addition, the terminal device simultaneously uses the plurality of DRX configurations in an overlay manner, so as to reduce unnecessary physical downlink control channel monitoring in a process of monitoring the physical downlink control channel, thereby reducing energy consumption of the terminal device.

18 Claims, 8 Drawing Sheets

(51) Int. Cl.
*H04W 72/08* (2009.01)
*H04W 52/02* (2009.01)

(58) Field of Classification Search
CPC .. H04W 52/0216; H04W 72/08; Y02D 30/70;
H04L 5/0078; H04L 5/0098
See application file for complete search history.

(56) References Cited

U.S. PATENT DOCUMENTS

| | | | | |
|---|---|---|---|---|
| 9,088,402 | B2* | 7/2015 | Kim | H04W 72/042 |
| 9,155,044 | B2* | 10/2015 | Chung | H04W 72/042 |
| 9,203,566 | B2* | 12/2015 | Terry | H04W 52/0216 |
| 10,912,029 | B2* | 2/2021 | Futaki | H04W 72/04 |
| 2010/0110897 | A1 | 5/2010 | Chun et al. | |
| 2010/0130137 | A1* | 5/2010 | Pelletier | H04W 72/04 |
| | | | | 455/68 |
| 2010/0234037 | A1* | 9/2010 | Terry | H04L 5/003 |
| | | | | 455/450 |
| 2010/0238880 | A1 | 9/2010 | Wu | |
| 2011/0002281 | A1* | 1/2011 | Terry | H04W 52/0216 |
| | | | | 370/329 |
| 2012/0176950 | A1* | 7/2012 | Zhang | H04L 5/0098 |
| | | | | 370/311 |
| 2012/0314635 | A1 | 12/2012 | Lee et al. | |
| 2013/0016614 | A1 | 1/2013 | Suzuki et al. | |
| 2016/0021699 | A1 | 1/2016 | Oh et al. | |
| 2016/0081020 | A1* | 3/2016 | Rahman | H04W 24/10 |
| | | | | 370/311 |
| 2016/0192433 | A1 | 6/2016 | Deenoo et al. | |
| 2017/0331610 | A1* | 11/2017 | Miao | H04L 5/001 |
| 2017/0367045 | A1* | 12/2017 | Rahman | H04W 76/15 |
| 2020/0015312 | A1* | 1/2020 | He | H04W 4/70 |

FOREIGN PATENT DOCUMENTS

| | | |
|---|---|---|
| CN | 101841897 A | 9/2010 |
| CN | 101998525 A | 3/2011 |
| CN | 102036347 A | 4/2011 |
| CN | 102098735 A | 6/2011 |
| CN | 102123447 A | 7/2011 |
| CN | 102273250 A | 12/2011 |
| CN | 102932884 A | 2/2013 |
| CN | 103636264 A | 3/2014 |
| CN | 104219738 A | 12/2014 |
| CN | 105992320 A | 10/2016 |
| WO | 2009120124 A1 | 10/2009 |

* cited by examiner

DRX CONFIGURATION METHOD, TERMINAL DEVICE, NETWORK DEVICE, AND COMMUNICATIONS SYSTEM

CROSS-REFERENCE TO RELATED APPLICATIONS

This application is a continuation of International Application No. PCT/CN2018/091494, filed on Jun. 15, 2018, which claims priority to Chinese Patent Application No. 201710459796.0, filed on Jun. 16, 2017. The disclosures of the aforementioned applications are hereby incorporated by reference in their entireties.

TECHNICAL FIELD

This application relates to the field of mobile communications technologies, and in particular, to a discontinuous reception (discontinuous reception, DRX) configuration method, a terminal device, a network device, and a communications system.

BACKGROUND

As a 4G (4th generation mobile communications) technology enters a scale commercial use stage, a future-oriented 5G (5th generation mobile communications) technology presenting more diversified service requirements correspondingly becomes a research hotspot. In the existing 4G technology, DRX is a working mode that reduces power consumption of user equipment (UE) and in which the user equipment enables a receiver only at a necessary time to enter an active state to receive downlink data and signaling, and disables the receiver at another time to enter a sleep state to stop receiving downlink data and signaling. DRX is classified into idle mode DRX and connected mode DRX. Idle mode DRX is implemented by monitoring a paging channel because there is no RRC connection and UE-specific bearer. Connected mode DRX is a DRX feature of user equipment in a radio resource control (RRC) connected mode, and is implemented by monitoring a physical downlink control channel (PDCCH).

Currently, there are only two DRX configurations in an existing long term evolution (LTE) system, that is, short cycle DRX (short DRX) and long cycle DRX, and only one of the DRX configurations can be activated at each moment. In an existing 4G application environment, a common application scenario of DRX is a service scenario that is insensitive to a latency and in which data needs to be received and sent at a few moments, such as a scenario of browsing a web page or a scenario of sending and receiving an email; or may be a service scenario in which a small quantity of small packets is generated, such as a Presence service scenario; or may be a service scenario in which consecutive small packets are periodically generated, such as a voice over internet protocol (voice over internet protocol, VoIP) service scenario. Therefore, in an existing DRX working mechanism, a plurality of service requirements of user terminal can be met by activating only one DRX configuration.

However, when the existing DRX working mechanism faces a 5G environment, one DRX configuration cannot meet the 5G application environment with more diversified service requirements.

SUMMARY

In view of this, embodiments of this application provide a DRX configuration method, a terminal device, a network device, and a communications system, to resolve a problem that a DRX working mechanism in the prior art cannot meet a 5G application environment with diversified service requirements.

The following technical solutions are provided in the embodiments of this application.

A first aspect of the embodiments of this application provides a DRX configuration method, and the method includes:

receiving, by a terminal device, N discontinuous reception (DRX) configurations sent by a network device, where the N DRX configurations respectively correspond to N groups of carriers, and N is an integer greater than or equal to 2; and;

when a DRX status of the terminal device is an active state, if M groups of carriers in the N groups of carriers are activated carriers, monitoring, by the terminal device, a physical downlink control channel on a specified carrier based on M DRX configurations corresponding to the M groups of carriers, where the specific carrier is some groups or all groups of the M groups of carriers, and M is a positive integer less than or equal to N.

In the foregoing solution, when the DRX status of the terminal device is the active state, the terminal device monitors, based on the plurality of DRX configurations sent by the network device, the physical downlink control channel on carriers corresponding to the plurality of enabled/activated DRX configurations, thereby meeting quality of service requirements of different services sent by the terminal device. In addition, the terminal device simultaneously uses the plurality of DRX configurations in an overlay manner, so as to reduce unnecessary physical downlink control channel monitoring in a process of monitoring the physical downlink control channel, thereby reducing energy consumption of the terminal device.

In a possible embodiment, when the DRX status of the terminal device is the active state, the M DRX configurations are used in an overlay manner.

In a possible embodiment, DRX cycles in different DRX configurations are different integral multiples of a minimum DRX cycle, and the minimum DRX cycle is preset; and/or a plurality of DRX start location offset values of the N DRX configurations are the same; and/or an on duration timer, the DRX-inactivity timer, and the DRX-retransmission timer in each DRX configuration have different parameter values.

In a possible embodiment, a DRX configuration includes a timer, the timer includes at least one of the on duration timer, the DRX-inactivity timer, the DRX-retransmission timer, and a DRX-uplink retransmission timer; and the method further includes:

the DRX status of the terminal device includes the active state or an inactive state; and if any timer included in any one of the M DRX configurations is in a running state, the DRX status of the terminal device is the active state.

In the foregoing solution, the DRX status of the terminal device is the active state, and the active state is a state in which a plurality of DRX configurations are overlaid.

In a possible embodiment, a parameter configured in each DRX configuration includes at least one of the following items: the on duration timer, the DRX cycle, the DRX-inactivity timer, the DRX-retransmission timer, a DRX-uplink retransmission timer, and the DRX start location offset value.

In a possible design, the monitoring, by the terminal device, a physical downlink control channel on the M groups of carriers based on M DRX configurations corresponding to the M groups of carriers includes:

in a running period of an inactivity timer of any one of the M DRX configurations, when it is detected, on a carrier corresponding to any one of the M DRX configurations, that there is first transmitted data on the physical downlink control channel, starting or restarting an inactivity timer of another DRX configuration, or starting or restarting an inactivity timer corresponding to any one of the M DRX configurations.

In the foregoing solution, in a running period of an inactivity timer of any one of the DRX configurations, when the terminal device monitors the physical downlink control channel on a corresponding carrier and successfully demodulates the first transmitted data belonging to the terminal device, the terminal device starts or restarts an inactivity timer of another DRX configuration or an inactivity timer corresponding to a DRX configuration used by the terminal device, so as to avoid unnecessary physical downlink control channel monitoring, thereby reducing energy consumption of the terminal device.

In a possible embodiment, the method further includes:

the N DRX configurations correspond to a same physical resource use attribute or different physical resource use attributes, and the physical resource use attribute is related to any timer in the N DRX configurations or a quantity of carriers in a group of carriers corresponding to each of the N DRX configurations; and the physical resource use attribute includes at least one of the following items: a resource cycle, a transmission time interval, a subcarrier spacing, and a coding scheme.

In a possible embodiment, before the receiving, by a terminal device, N DRX configurations sent by a network device, the method further includes:

sending, by the terminal device, indication information to an access network device, where the indication information is used to indicate whether the terminal device supports receiving of a plurality of discontinuous reception DRX configurations.

In a possible embodiment, the method further includes:

receiving, by the terminal device, a control message sent by the network device, where the control message includes indication information for adjusting the N DRX configurations; and adjusting, by the terminal device, the N DRX configurations based on the control message by using the indication information for adjusting a plurality of DRX configurations.

In the foregoing solution, after receiving the control message actively sent by the network device, the terminal device adjusts the plurality of DRX configurations based on the control message. Therefore, adjustment on the plurality of DRX configurations that are used in an overlay manner can be quickly completed, thereby further meeting quality of service requirements of different services sent by the terminal device. In addition, energy consumption of the terminal device can also be reduced.

In a possible embodiment, before the receiving, by the terminal device, a control indication sent by the network device, the method further includes:

sending, by the terminal device, an adjustment request message to the network device, where the adjustment request message includes indication information indicating a DRX configuration that the terminal device requests to adjust; and receiving, by the terminal device, the control message sent by the network device, where the control message is sent by the network device in response to the adjustment request message.

In the foregoing solution, the terminal device reports the adjustment request message to the network device based on a service requirement, and performs, based on the control message delivered by the network device in response to the adjustment request message, activation or deactivation adjustment on one or more of the plurality of DRX configurations that are simultaneously used in an overlay manner, or even the plurality of DRX configurations that are simultaneously used in an overlay manner currently. Therefore, when a quality of service requirement of a service is increased or a new service is sent, adjustment on the plurality of DRX configurations that are used in an overlay manner can be quickly completed, thereby further meeting quality of service requirements of different services sent by the terminal device. In addition, energy consumption of the terminal device can also be reduced.

In a possible embodiment, the terminal device receives a control message sent by the network device. The control message is a radio resource control (RRC) reconfiguration message, the control message is a discontinuous reception media access control command, or the control message is a preset downlink control command. A correspondence exists between the downlink control command and a group of DRX configurations, and the group of DRX configurations includes one or more DRX configurations.

A second aspect of the embodiments of this application provides a DRX configuration method, and the method includes:

configuring, by a network device, N DRX configurations, where the N DRX configurations respectively correspond to N groups of carriers, and N is an integer greater than or equal to 2;

sending, by the network device, the N DRX configurations to the terminal device; and when M groups of carriers in the N groups of carriers are activated carriers, sending, by the network device, a physical downlink control channel to the terminal device based on the M DRX configurations by using a specified carrier, where the specified carrier is some groups or all groups of the M groups of carriers, and M is a positive integer less than or equal to N.

In the foregoing solution, the network device configures parameters in a plurality of DRX configurations, and sends the obtained plurality of DRX configurations to the terminal device, so that when a DRX status is an active state, the terminal device monitors the physical downlink control channel on carriers corresponding to the plurality of activated/enabled DRX configurations, thereby meeting quality of service requirements of different services sent by the terminal device. In addition, the terminal device simultaneously uses the plurality of DRX configurations in an overlay manner, so as to reduce unnecessary physical downlink control channel monitoring in a process of monitoring the physical downlink control channel, thereby reducing energy consumption of the terminal device.

In a possible design, DRX cycles in different DRX configurations are different integral multiples of a minimum DRX cycle, and the minimum DRX cycle is preset; and/or a plurality of DRX start location offset values of the N DRX configurations are the same; and/or an on duration timer, a DRX-inactivity timer, and a DRX-retransmission timer in each DRX configuration have different parameter values.

In a possible embodiment, a DRX configuration includes a timer, the timer includes at least one of the on duration timer, the DRX-inactivity timer, the DRX-retransmission timer, and a DRX-uplink retransmission timer; and the method further includes:

determining, by the network device based on any timer included in any one of the M DRX configurations is in a running state, that the DRX status of the terminal device is the active state.

In a possible embodiment, a parameter configured in each DRX configuration includes at least one of the following items: the on duration timer, the DRX cycle, the DRX-inactivity timer, the DRX-retransmission timer, and the DRX start location offset value.

In a possible embodiment, in a running period of an inactivity timer of any one of the M DRX configurations, the network device sends downlink data on a carrier corresponding to the DRX configuration.

In a possible embodiment, the method further includes:

the N DRX configurations correspond to a same physical resource use attribute or different physical resource use attributes, and the physical resource use attribute is related to any timer in the N DRX configurations or a quantity of carriers in a group of carriers corresponding to each of the N DRX configurations; and the physical resource use attribute includes at least one of the following items: a resource cycle, a transmission time interval, a subcarrier spacing, and a coding scheme.

In a possible embodiment, the method further includes: sending, by the network device, a control message to the terminal device, where the control message includes indication information for adjusting a plurality of DRX configurations, so that the terminal device adjusts the plurality of DRX configurations by using the indication information for adjusting a plurality of DRX configurations.

In the foregoing solution, the network device actively sends the control message to the terminal device, so that the terminal device adjusts the plurality of DRX configurations based on the control message. Therefore, adjustment on the plurality of DRX configurations that are used in an overlay manner can be quickly completed, thereby further meeting quality of service requirements of different services sent by the terminal device. In addition, energy consumption of the terminal device can also be reduced.

In a possible embodiment, the method further includes: receiving, by the network device, an adjustment request message sent by the terminal device, where the adjustment request message includes indication information indicating a DRX configuration that the terminal device requests to adjust; and responding, by the network device, to the adjustment request message, generating a corresponding control message, and sending the control message to the terminal device.

In the foregoing solution, the network device receives the adjustment request message reported by the terminal device based on a service requirement, and generates and delivers the corresponding control message to the terminal device in response to the adjustment request message, so that the terminal device performs activation or deactivation adjustment on one or more of the plurality of DRX configurations that are simultaneously used in an overlay manner, or even the plurality of DRX configurations that are simultaneously used in an overlay manner currently. Therefore, when a quality of service requirement of a service is increased or a new service is sent, adjustment on the plurality of DRX configurations that are used in an overlay manner can be quickly completed, thereby further meeting quality of service requirements of different services sent by the terminal device. In addition, energy consumption of the terminal device can also be reduced.

In a possible embodiment, the network device sends a control message to the terminal device. The control message is an RRC reconfiguration message, the control message is a discontinuous reception media access control command, or the control message is a preset downlink control command. A correspondence exists between the downlink control command and a group of DRX configurations, and the group of discontinuous reception DRX configurations includes one or more discontinuous reception DRX configurations.

A third aspect of the embodiments of this application provides a terminal device, and the terminal device includes:

a receiving unit, configured to receive N DRX configurations sent by a network device, where the N DRX configurations respectively correspond to N groups of carriers, and N is an integer greater than or equal to 2; and a processing unit, configured to: when a DRX status of the terminal device is an active state, if M groups of carriers in the N groups of carriers are activated carriers, monitor a physical downlink control channel on a specified carrier based on M DRX configurations corresponding to the M groups of carriers, where the specified carrier is some groups or all groups of the M groups of carriers, and M is a positive integer less than or equal to N.

In a possible embodiment, the processing unit is configured to: when the DRX status of the terminal device is the active state, use the M DRX configurations in an overlay manner.

In a possible embodiment, the receiving unit is configured to receive the N DRX configurations sent by the network device. DRX cycles in different DRX configurations are different integral multiples of a minimum DRX cycle, the minimum DRX cycle is preset; and/or a plurality of DRX start location offset values of the N DRX configurations are the same; and/or an on duration timer, the DRX-inactivity timer, and the DRX-retransmission timer in each DRX configuration have different parameter values.

In a possible embodiment, the receiving unit is configured to receive the N DRX configurations sent by the network device. A DRX configuration includes a timer, and the timer includes at least one of the on duration timer, the DRX-inactivity timer, the DRX-retransmission timer, and a DRX-uplink retransmission timer.

Correspondingly, the processing unit is further configured to determine the DRX status of the terminal device. The DRX status of the terminal device includes the active state or an inactive state; and if any timer included in any one of the M DRX configurations is in a running state, the DRX status of the terminal device is the active state.

In a possible embodiment, the receiving unit is configured to receive the N DRX configurations sent by the network device, a parameter configured in each DRX configuration includes at least one of the following items: the on duration timer, the DRX cycle, the DRX-inactivity timer, the DRX-retransmission timer, a DRX-uplink retransmission timer, and the DRX start location offset value.

In a possible embodiment, the processing unit that monitors the physical downlink control channel on the specified carrier based on the M DRX configurations corresponding to the M groups of carriers is specifically configured to: in a running period of an inactivity timer in any one of the M DRX configurations, when it is detected, on a carrier corresponding to any one of the M DRX configurations, that there is first transmitted data on the physical downlink control channel, start or restart an inactivity timer of another DRX configuration, or start or restart inactivity timers corresponding to the M DRX configurations.

In a possible embodiment, the receiving unit is further configured to receive the N DRX configurations sent by the network device. The N DRX configurations correspond to a same physical resource use attribute or different physical resource use attributes, and the physical resource use attribute is related to any timer in the N DRX configurations or a quantity of carriers in a group of carriers corresponding to each of the N DRX configurations.

The physical resource use attribute includes at least one of the following items: a resource cycle, a transmission time interval, a subcarrier spacing, and a coding scheme.

In a possible embodiment, the receiving unit is further configured to receive a control message delivered by the network device, where the control message includes indication information for adjusting a plurality of DRX configurations.

Correspondingly, the processing unit is further configured to adjust the plurality of DRX configurations based on the control message by using the indication information for adjusting a plurality of DRX configurations.

In a possible embodiment, the sending unit in the terminal device is configured to send an adjustment request message to the network device before the receiving unit receives the control indication sent by the network device, where the adjustment request message includes indication information indicating a DRX configuration that the terminal device requests to adjust.

Correspondingly, the receiving unit is configured to receive the control message sent by the network device, where the control message is sent by the network device in response to the adjustment request message.

In a possible embodiment, the receiving unit receives a control message sent by the network device. The control message is an RRC reconfiguration message, the control message is a discontinuous reception media access control command, or the control message is a preset downlink control command. A correspondence exists between the downlink control command and a group of DRX configurations, and the group of DRX configurations includes one or more DRX configurations.

A fourth aspect of the embodiments of this application provides a network device, and the network device includes:

a processing unit, configured to configure N DRX configurations, where the N DRX configurations respectively correspond to N groups of carriers, N is an integer greater than or equal to 2, and M groups of carriers in the N groups of carriers are activated carriers; and a sending unit, configured to: send the N DRX configurations to the terminal device, and send a physical downlink control channel to the terminal device based on the M DRX configurations by using a specified carrier, where the specified carrier is some groups or all groups of the M groups of carriers, and M is a positive integer less than or equal to N.

In a possible embodiment, the processing unit that configures the N DRX configurations is configured to configure DRX cycles in different DRX configurations as integral multiples of a minimum DRX cycle, and/or the processing unit is configured to configure a plurality of DRX start location offset values of the N DRX configurations to be the same; and/or the processing unit is configured to configure that an on duration timer, a DRX-inactivity timer, and a DRX-retransmission timer in each DRX configuration have different parameter values.

In a possible embodiment, the processing unit that configures the N DRX configurations is configured to configure at least one of the following parameters included in each DRX configuration, and the parameters include the on duration timer, the DRX cycle, the DRX-inactivity timer, the DRX-retransmission timer, a DRX-uplink retransmission timer, and the DRX start location offset value.

In a possible embodiment, the processing unit is further configured to configure a same physical resource use attribute or different physical resource use attributes corresponding to the N DRX configurations, the physical resource use attribute is related to any timer in the N DRX configurations or a quantity of carriers in a group of carriers corresponding to each of the N DRX configurations, and the physical resource use attribute includes at least one of the following items: a resource cycle, a transmission time interval, a subcarrier spacing, and a coding scheme.

In a possible embodiment, the sending unit is further configured to send a control message to the terminal device, where the control message includes indication information for adjusting a plurality of DRX configurations, so that the terminal device adjusts the plurality of the DRX configurations by using the indication information for adjusting a plurality of DRX configurations.

In a possible embodiment, the receiving unit in the network device is configured to receive an adjustment request message sent by the terminal device, where the adjustment request message includes indication information indicating a DRX configuration that the terminal device requests to adjust.

Correspondingly, the processing unit is configured to: respond to the adjustment request message, generate a corresponding control message, and send the control message to the terminal device by using the sending unit.

In a possible embodiment, the sending unit sends a control message to the terminal device. The control message is an RRC reconfiguration message, the control message is a discontinuous reception media access control command, or the control message is a preset downlink control command. A correspondence exists between the downlink control command and a group of DRX configurations, and the group of DRX configurations includes one or more DRX configurations.

A fifth aspect of the embodiments of this application provides a communications system, and the communications system includes the terminal device in the third aspect and any possible design of the third aspect of the embodiments of this application, and the network device in the fourth aspect and any possible design of the fourth aspect of the embodiments of this application.

A sixth aspect of the embodiments of this application provides a computer readable storage medium, configured to store a computer program. The computer program includes an instruction for performing the method in the first aspect, the second aspect, any possible design of the first aspect, or any possible design of the second aspect.

A seventh aspect of the embodiments of this application provides a computer program product including an instruction. When the instruction is run on a computer, the computer is enabled to perform the method according to each of the foregoing aspects.

An eighth aspect of the embodiments of this application provides a chip system. The chip system includes a processor, configured to support a network device and a terminal device in implementing functions in the foregoing aspects, for example, generating or processing data and/or information in the foregoing methods. In a possible design, the chip system further includes a memory. The memory is configured to store program instructions and necessary data that are necessary for the network device and the terminal device. The chip system may include a chip, or may include a chip and another discrete device.

DESCRIPTION OF EMBODIMENTS

The embodiments of this application provide a DRX configuration method, a terminal device, a network device, and a communications system, to monitor, when a DRX status of a terminal device is an active state ON, a physical downlink control channel on carriers corresponding to a plurality of enabled/activated DRX configurations, thereby meeting quality of service requirements of different services sent by the terminal device.

In the embodiments, claims, and accompanying drawings of this application, the terms "first", "second", and the like are intended to distinguish between different objects but do not indicate a particular order. In addition, the terms "include" and "have" are not exclusive. For example, a process, a method, a system, a product, or a device including a series of steps or units is not limited to the listed steps or units, and may further include steps or units that are not listed.

DRX, namely, discontinuous reception, is a working mode that reduces power consumption of UE and in which a terminal device enables a receiver only at a necessary time to enter an active state to receive downlink data and signaling, and disables the receiver at another time to enter a sleep state to stop receiving downlink data and signaling. DRX is classified into idle mode DRX and connected mode DRX. Connected mode DRX is a DRX feature of UE in an RRC connected mode, and is implemented by monitoring a physical downlink control channel.

Figure 1:
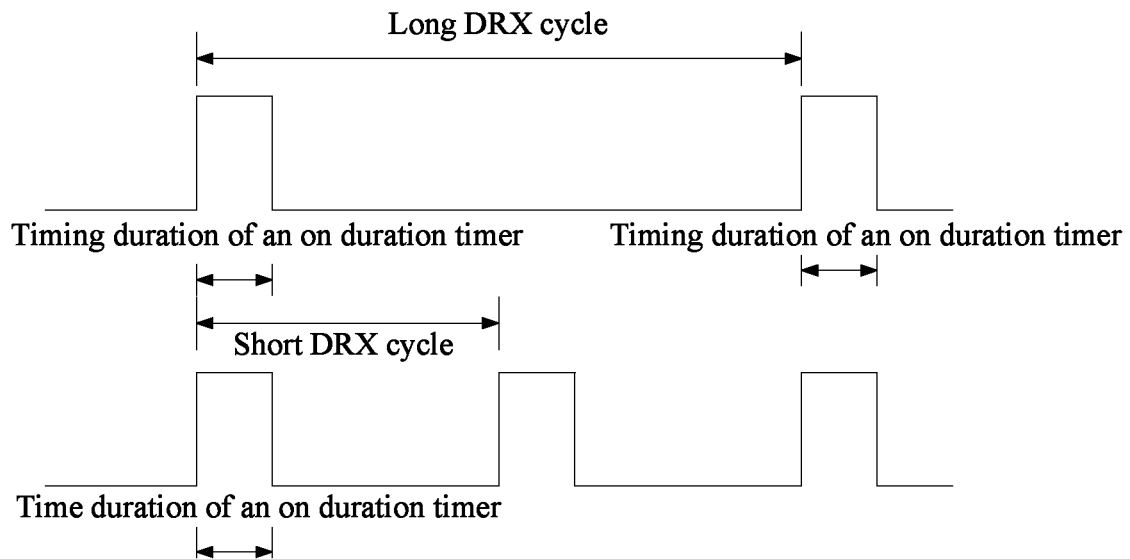
FIG. 1 is a schematic diagram of a long DRX cycle and a short DRX cycle according to an embodiment of this application.

A DRX configuration mainly includes the following several parameters:

1. DRX cycle (drx-cycle), that is, a cycle of discontinuous reception: In each DRX cycle, UE is timed to wake up for a period of time to receive data. In an LTE system, the DRX cycle includes two types: a long cycle and a short cycle. A length of the long DRX cycle (long drx-cycle) is an integral multiple of a length of the short DRX cycle (short drx-cycle). FIG. 1 is a schematic diagram of a long DRX cycle and a short DRX cycle.

2. On duration timer (on duration timer): The on duration timer may be understood as a quantity of a segment of consecutive downlink subframes, and indicates a time that the UE can maintain wakeup after the UE wakes up. In the quantity of the segment of consecutive downlink subframes, that is, in a timing time period of the on duration timer, the UE needs to monitor a physical downlink control channel. As shown in FIG. 1, the on duration timer is started at a start moment of each DRX cycle.

Figure 2:
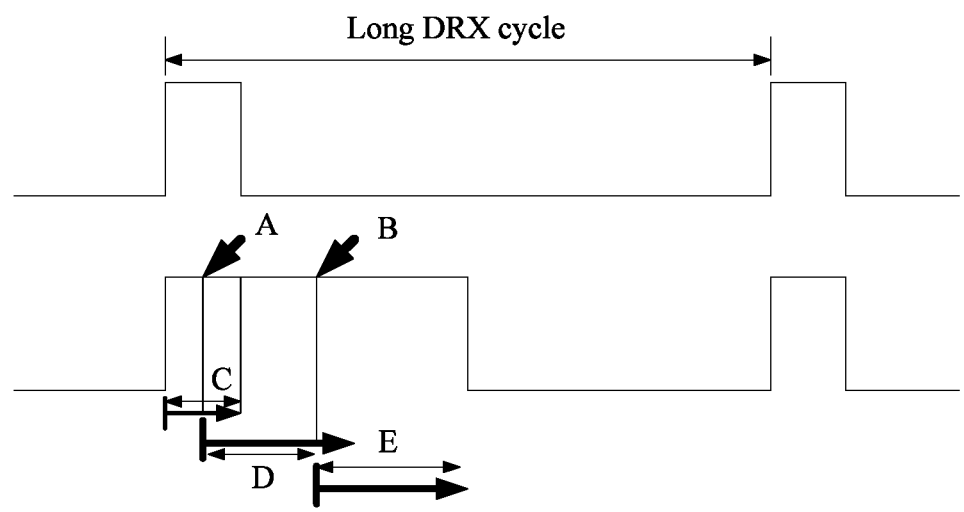
FIG. 2 is a schematic working diagram of each timer related to a DRX cycle according to an embodiment of this application.

3. DRX-inactivity timer (drx-inactivity timer): The DRX-inactivity timer may also be understood as a quantity of a segment of consecutive downlink subframes. The DRX-inactivity timer is started or restarted when a terminal device successfully demodulates a physical downlink control channel of first transmitted data belonging to the terminal device. Likewise, the terminal device also needs to continue to monitor a physical downlink control channel in a timing time period of the DRX-inactivity timer. FIG. 2 is a schematic working diagram of each timer related to a DRX cycle. In FIG. 2, both a point A and a point B indicate that the physical downlink control channel of the first transmitted data is received at a current moment.

A process of starting and restarting the DRX-inactivity timer is as follows: In a long DRX cycle, when the terminal device monitors a physical downlink control channel in a timing time period of an on duration timer (C in FIG. 2 is used to mark the timing time period of the on duration timer) and when the terminal device successfully demodulates, at the point A, a physical downlink control channel of one piece of first transmitted data belonging to the terminal device, the DRX-inactivity timer (D in FIG. 2 is used to mark the timing time period of the DRX-inactivity timer) is started. The terminal device continues to monitor a physical downlink control channel in the timing time period of the DRX-inactivity timer. When the terminal device successfully demodulates, at the point B, a physical downlink control channel of another piece of first transmitted data belonging to the terminal device, the DRX-inactivity timer (E in FIG. 2 is used to mark a timing time period of the DRX-inactivity timer after restart) is restarted. Then the terminal device continues to monitor a physical downlink control channel in the timing period of the DRX-inactivity timer.

4. Hybrid automatic repeat request (hybrid automatic repeat request, HARQ) round trip time (round trip time, RTT) timer (Timer): The hybrid automatic repeat request round trip time timer may be understood as a minimum retransmission scheduling interval. The hybrid automatic repeat request round trip time timer indicates a quantity of downlink subframes after which a next downlink hybrid automatic repeat request retransmission first occurs. The hybrid automatic repeat request round trip time timer is started in the following cases:

a. Downlink first transmitted data occurs and the data is not demodulated correctly.

b. Downlink retransmission data occurs.

5. DRX-retransmission timer (drx-RetransmissionTimer): The DRX-retransmission timer may be understood as a time waited for receiving downlink retransmission scheduling. To be specific, the DRX-retransmission timer indicates a longest time that a terminal device in an active state waits for downlink retransmission data. The DRX-retransmission timer is started when the hybrid automatic repeat request round trip time timer expires and the terminal device does not correctly demodulate the corresponding downlink data. Correspondingly, there is further a DRX-uplink retransmission timer (drx-UL Retransmission timer), and the DRX-uplink retransmission timer may be understood as a time waited for receiving uplink retransmission. A function of the DRX-uplink retransmission timer is similar to that of the DRX-retransmission timer.

6. DRX media access control command (drx command mac ce): The DRX media access control command may be understood as MAC signaling that enables a terminal device to immediately enter a sleep period. When receiving the DRX media access control command, the terminal device immediately stops an on duration timer and a DRX-inactivity timer.

7. DRX short cycle timer (drx short cycle timer): The DRX short cycle timer may be understood as a life cycle of short cycle DRX. After the DRX short cycle timer expires, a long cycle needs to be used. In a case of a short cycle DRX configuration, the DRX short cycle timer is started or restarted in two cases:

a. A DRX-inactivity timer expires.

b. A terminal device receives the DRX media access control command

8. DRX start location offset value (drxstartoffset): Start-offset is a start subframe in an LTE system. However, because different DRX may have different time units in a 5G system, DRX is not necessarily measured by using a subframe. DRX may be measured by a millisecond, a transmission time interval length, or in another time unit. Therefore, in the 5G system, StartOffset may be understood as a start location, a start location offset, or a start location offset value.

In the 5G system, a 5G new radio (NR) has a plurality of service features and a plurality of service requirements. For example, quality of service (QoS) requirements are mainly a latency, reliability, and a rate.

It can be learned from the background that in the working mechanism with only two DRX configurations in existing LTE, a plurality of service requirements of the terminal device can be met by activating one of the DRX configurations by the terminal device at each time. However, in the 5G system, based on the plurality of service features and the plurality of service requirements in the 5G new radio, the two existing DRX configurations cannot meet a plurality of service requirements of the terminal device in the 5G system. Therefore, how to meet diversified service requirements of the terminal device in a 5G application environment is a problem that needs to be resolved currently.

Therefore, the embodiments of this application provide a corresponding DRX configuration method, a related device, and a communications system, to meet quality of service requirements of different services sent by the terminal device in a 5G application environment.

Figure 3:
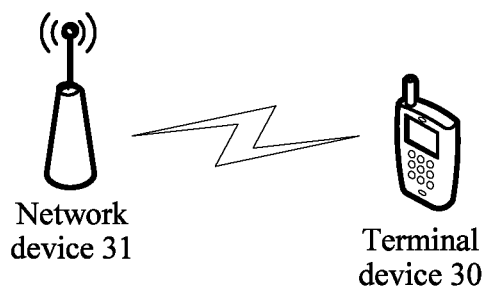
FIG. 3 is a diagram of an application scenario of a communications system according to an embodiment of this application.

The related device includes a terminal device and a network device. FIG. 3 is a schematic diagram of an application scenario of a communications system including a terminal device and a network device according to an embodiment of this application. The application scenario includes a terminal device 30 and a network device 31. The terminal device 30 accesses a communications network 32 by using the network device 31. The terminal device 30 and the network device 31 communicate with each other by using a radio signal.

The terminal device may be a wired device, or may be a wireless device. The wireless device may be a handheld device having a wireless connection function, or another processing device connected to a wireless modem, or a mobile terminal that communicates with one or more core networks by using a radio access network. For example, the wireless terminal may be a mobile phone, a mobile phone, a computer, a tablet computer, a personal digital assistant (PDA), a mobile internet device (MID), a wearable device, an electronic reader, or the like. For another example, the wireless terminal may be a portable, pocket-sized, handheld, computer built-in, or vehicle-mounted mobile device. For still another example, the wireless terminal may be a mobile station or an access point. In addition, UE is also a type of terminal device, and is usually referred to as a terminal device in an LTE system.

The network device may be a base station, or may be another device that sends a control channel. The base station may include a macro base station, a micro base station, a relay station, an access point, a base station controller, a sending point, a receiving point, and the like in various forms. In systems using different radio access technologies, specific names of the base station may be different.

A terminal device in the embodiments of this application may be specifically UE, and an access network device in the embodiments of this application may be a base station.

The base station is configured to: receive data, a request message, and the like that are reported by the UE; send a synchronization signal, a broadcast message, a control command, and the like to the UE; send a plurality of DRX configurations to the UE; and deliver a control message that includes activating, deactivating, or replacing one or more DRX configurations.

The UE is configured to: receive the synchronization signal, the broadcast message, the control command, and the like from the base station; simultaneously use, in an active state of the UE, the plurality of DRX configurations in an overlay manner to monitor a physical downlink control channel based on that the plurality of DRX configurations sent by the base station; and activate, deactivate, or replace one or more DRX configurations based on the control message delivered by the base station.

It should be noted that in the application scenario of the communications system shown in FIG. 3, a case in which there is only one terminal device 30 and one network device 31 is shown. This application is not limited thereto. Within coverage of the communications system, the communications system may further include another quantity of wireless communications devices other than the terminal device 30. Optionally, the communications system shown in FIG. 3 may further include another network device, and the like. This is not limited in this embodiment of this application.

The terminal device and the access network device disclosed in the embodiments of this application include a hardware device and software running on the hardware device.

Compared with the prior art, in the DRX configuration method disclosed in the embodiments of this application, the network device configures a plurality of DRX configurations, and sends the plurality of DRX configurations to the terminal device. When a DRX status of the terminal device is an active state, the terminal device monitors a physical downlink control channel by using the plurality of DRX configurations, thereby meeting quality of service requirements of different services sent by the terminal device. In addition, the terminal device simultaneously uses the plurality of DRX configurations in an overlay manner, so as to reduce unnecessary physical downlink control channel monitoring in a process of monitoring the physical downlink control channel, thereby reducing energy consumption of the terminal device.

A specific implementation process of the DRX configuration technical solution disclosed in the embodiments of this application are described in detail by using the following embodiments.

Figure 4:
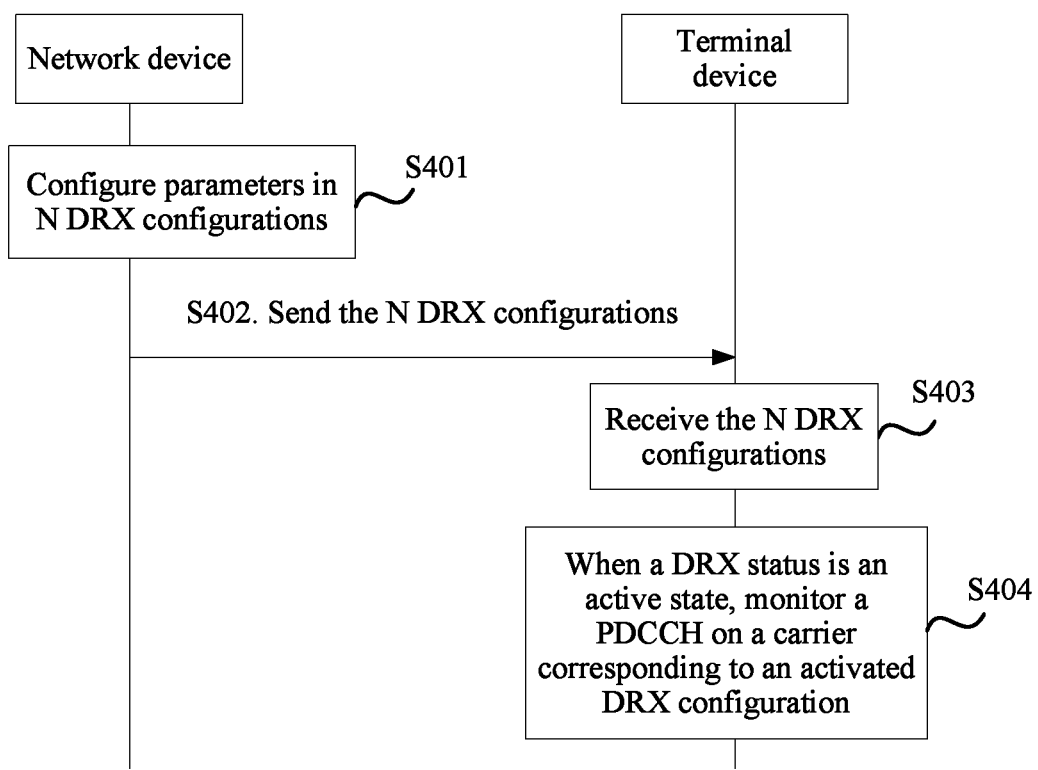
FIG. 4 is a schematic flowchart of a DRX configuration method according to an embodiment of this application.

Based on the schematic diagram of the application scenario of the communications system shown in FIG. 3, FIG. 4 is a schematic flowchart of a DRX configuration method according to an embodiment of this application, and the method includes the following operations.

Operation S401. A network device configures N DRX configurations, where the N DRX configurations respectively correspond to N groups of carriers, and N is an integer greater than or equal to 2.

In one embodiment, the network device configures parameters in the N DRX configurations. A parameter configured in each of the N configured DRX configurations includes at least one of the following items: an on duration timer, a DRX cycle, a DRX-inactivity timer, a DRX-retransmission timer, and a DRX start location offset value.

In one embodiment, when configuring DRX cycles of a plurality of different DRX configurations, the network device uses an obtained minimum DRX cycle as a base, and uses different integral multiples of the minimum DRX cycle as DRX cycles in different DRX configurations.

To be specific, DRX cycles in different DRX configurations are different integral multiples of the minimum DRX cycle.

For example, the minimum DRX cycle may be preset based on a service requirement of a terminal device in a 5G application environment, or may be fixed by using a corresponding standard protocol.

For example, a value of the minimum DRX cycle may be 2. Assuming that there are four DRX configurations, DRX cycles in different DRX configurations may be 4, 6, and 8. A unit of the DRX cycle may be a subframe (subframe) or a transmission time interval length (TTI length).

In one embodiment, when configuring DRX cycles of a plurality of different DRX configurations, the network device may use a same DRX cycle value range, and values of different DRX cycles in the value range are integral multiples of each other. Therefore, when configuring different DRX cycles, the network device may select DRX cycle values from the value range and configure the DRX cycles.

For example, the DRX cycle value range may be {2, 4, 6, 8, 10, 16, 20, 32, 40, 64, 80, 128, 160, 256, 320, 512, 640}, and values in the value range may be evenly or non-evenly set. A unit of the DRX cycle may be a subframe or a transmission time interval length. Assuming that there are four DRX configurations, DRX cycles in different DRX configurations may be 4, 16, and 128.

In one embodiment, each DRX configuration may further include a hybrid automatic repeat request round trip time timer and an uplink hybrid automatic repeat request round trip time timer. A unit set for each of the timers may be a subframe, a transmission time interval length, a millisecond, or another unit. Optionally, the DRX cycle in each DRX configuration may be classified into a short DRX cycle and a long DRX cycle. A method for configuring the short DRX cycle and the long DRX cycle is the same as that for configuring the DRX cycle. Details are not described herein again.

In addition, when two types of cycles, that is, the short DRX cycle and the long DRX cycle, are set in each DRX configuration, a DRX short cycle timer (DRX short cycle timer) is correspondingly set, which may be understood as a life cycle of a short cycle. After the DRX short cycle timer expires, a long cycle needs to be used.

In one embodiment, the plurality of DRX configurations may further include configuration of these timers.

In one embodiment, when configuring DRX start location offset values of the N DRX configurations, the network device configures a plurality of DRX start location offset values of the plurality of DRX configurations to be the same.

In one embodiment, when configuring a timer in each DRX configuration, the network device may configure different parameter values for different timers, so that different timers in each DRX configuration have different parameter values. The network device may alternatively configure a same parameter value for different timers.

In one embodiment, each DRX configuration may include at least one of the on duration timer, the DRX-inactivity timer, the DRX-retransmission timer, and a DRX-uplink retransmission timer. The network device determines, based on that any timer included in any one of M DRX configurations is in a running state, that a DRX status of the terminal device is an active state.

For example, when a DRX configuration includes the on duration timer, the DRX-inactivity timer, and the DRX-retransmission timer, the network device may set different parameter values for the on duration timer, the DRX-inactivity timer, and the DRX-retransmission timer. The network device may alternatively set a same parameter value for the on duration timer, the DRX-inactivity timer, and the DRX-retransmission timer. The network device may alternatively set a same parameter value for the on duration timer and the DRX-inactivity timer, and set, for the DRX-retransmission timer, a parameter value different from the parameter value of each of the on duration timer and the DRX-inactivity timer. To be specific, different timers in each DRX configuration have a same parameter value or different parameter values.

In one embodiment, a unit set for each of the on duration timer, the DRX-inactivity timer, and the DRX-retransmission timer may be a subframe, a transmission time interval length, or a millisecond. Alternatively, a time for monitoring a physical downlink channel is used as a unit, such as a PDCCH subframe, a PDCCH TTI, or a PDCCH ms. In addition, a time amount in another form can be used as a basic unit of the timer.

Further, the foregoing configuration manner is also applicable to a DRX configuration having two timers. Alternatively, with evolution of a communications system and emergence of a new service scenario, when the DRX configuration can include more timers, the foregoing configuration manner is also applicable.

Further, in a running period of an inactivity timer of any one of the M DRX configurations, the network device sends downlink data on a carrier corresponding to the DRX configuration.

Further, the N DRX configurations correspond to a same physical resource use attribute or different physical resource use attributes, and the physical resource use attribute is related to any timer in the N DRX configurations or a quantity of carriers in a group of carriers corresponding to each of the N DRX configurations. The physical resource use attribute includes at least one of the following items: a resource cycle, a transmission time interval, a subcarrier spacing, and a coding scheme.

In one embodiment, when M groups of carriers in the N groups of carriers are activated carriers, the network device sends a physical downlink control channel to the terminal device based on the M DRX configurations by using the M groups of carriers, where M is a positive integer less than or equal to N.

Because different carriers work independently, the carriers do not interfere with each other. In specific implementation, for a plurality of DRX configurations, the network device may establish a correspondence between different DRX configurations and different carriers based on a carrier aggregation technology or a multi-carrier technology, so that each DRX configuration corresponds to one group of carriers.

For the terminal device, on a carrier used by the terminal device, whether there is data that needs to be received or scheduled for transmission in a transmission time unit depends on whether the terminal device can detect a downlink control message including scheduling information. The downlink control message is carried on the physical downlink control channel.

Therefore, in this embodiment of this application, when the DRX status of the terminal device is the activate state "ON", the terminal device monitors the physical downlink control channel on the carriers corresponding to the plurality of DRX configurations. That the DRX status is the activate state includes a state in which the plurality of DRX configurations are overlaid. A case in which the DRX status is the active state is subsequently described in detail.

Operation S402. The network device sends the N DRX configurations to the terminal device.

In one embodiment, before the access network device sends the plurality of DRX configurations to the terminal device, the terminal device may indicate, to the access network device, whether the terminal device supports receiving of a plurality of DRX configurations. Therefore, the network device may determine, based on whether UE supports a plurality of DRX configurations and a gain (for example, energy consumption reduction) that may be brought by the plurality of DRX configurations, whether to configure the plurality of DRX configurations for the terminal device and send the plurality of DRX configurations to the terminal device. How the network device specifically makes a decision depends on implementation of the network device or is based on a specific algorithm.

Operation S403. The terminal device receives the N DRX configurations sent by the network device.

In one embodiment, the terminal device stores the received N DRX configurations. Based on the foregoing description, each of the N DRX configurations received by the terminal device corresponds to one group of carriers. Each DRX configuration includes at least one of the following parameters: the on duration timer, the DRX cycle, the DRX-inactivity timer, the DRX-retransmission timer, and the DRX start location offset value.

In one embodiment, DRX cycles in different DRX configurations are different integral multiples of a minimum DRX cycle.

For example, the minimum DRX cycle may be preset by the network device based on a service requirement of the terminal device in a 5G application environment, or may be fixed by using a corresponding standard protocol.

In one embodiment, a plurality of DRX start location offset values of the N DRX configurations are the same.

In one embodiment, different timers in each DRX configuration have a same parameter value or different parameter values. For specific configuration, refer to the related descriptions of the network device. Details are not described herein again.

Operation S404. When the DRX status of the terminal device is the active state, if the M groups of carriers in the N groups of carriers are activated carriers, the terminal device monitors the physical downlink control channel on the specified carrier based on the M DRX configurations corresponding to the M groups of carriers, where the specified carrier is some groups or all groups of the M groups of carriers, and M is a positive integer less than or equal to N.

In one embodiment, a precondition for the terminal device to monitor the physical downlink control channel on the M carriers corresponding to the M activated DRX configurations is that the DRX status of the terminal device is the active state. The DRX status includes the active state or an inactive state.

The active state is a state in which the N DRX configurations are overlaid. This specifically means that when any timer in DRX configurations that correspond to all activated carriers and that are simultaneously used by the terminal device in an overlay manner is in a running state, it may be configured that the DRX status of the terminal device is the active state. When all timers in the DRX configurations corresponding to all the activated carriers are in the inactive state, it may be considered that the DRX status of the terminal device is the inactive state.

Figure 5:
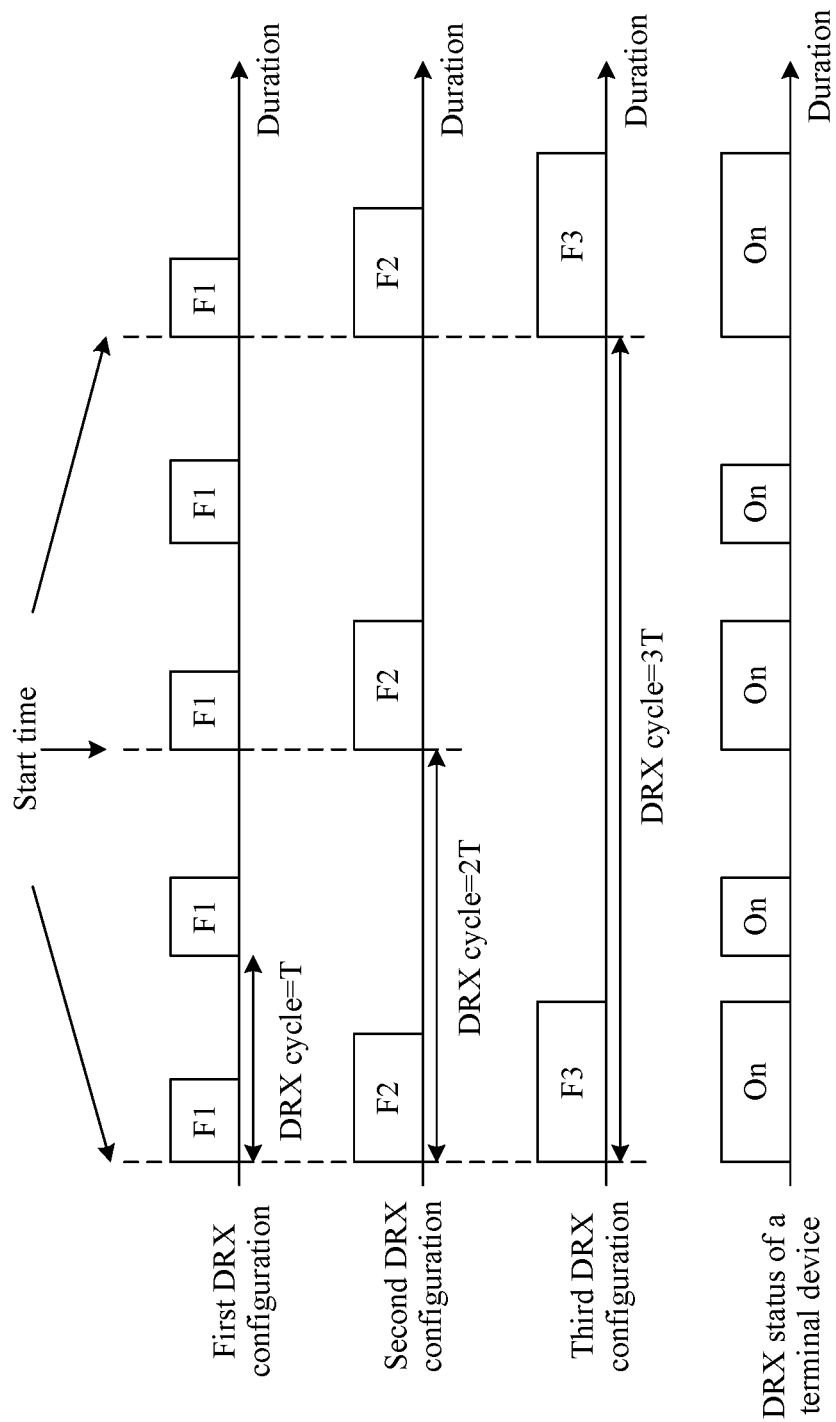
FIG. 5 is a schematic diagram of a process in which a terminal device simultaneously uses three activated DRX configurations in an overlay manner according to an embodiment of this application.

For example, FIG. 5 shows a process in which a terminal device simultaneously uses three activated DRX configurations in an overlay manner. In FIG. 5, a DRX cycle of a first DRX configuration is T, and a running period of an on duration timer of the first DRX configuration is represented by F1. A DRX cycle of a second DRX configuration is 2 T, and a running period of an on duration timer of the second DRX configuration is represented by F2. A DRX cycle of a third DRX configuration is 3 T, and a running period of an on duration timer of the third DRX configuration is represented by F3. Based on the foregoing description that the DRX status of the terminal device is the active state, in FIG. 5, "ON" is used to mark duration in which the terminal device is in the active state.

Further, with evolution of a communications system and emergence of a new service scenario, when more other types of timers appear in the DRX configuration, the foregoing manner in which the terminal device determines the DRX status of the terminal device is also applicable.

In one embodiment, the terminal device monitors a physical downlink control channel on a specified carrier based on M DRX configurations corresponding to M groups of carriers. In a running period of an inactivity timer of any of the M DRX configurations, the terminal device detects the physical downlink control channel on a carrier corresponding to the DRX configuration. When successfully demodulating first transmitted data belonging to the terminal device, the terminal device starts or restarts an inactivity timer of another DRX configuration. In one embodiment, the terminal device may start or restart an inactivity timer corresponding to any one of the M DRX configurations.

In one embodiment, when the terminal device monitors a physical downlink control channel on carriers corresponding to a plurality of activated DRX configurations, optionally, the terminal device determines a maximum on duration timer and a minimum DRX cycle from the plurality of DRX configurations. Then in running periods of the maximum on duration timer and the minimum DRX cycle, the terminal device monitors, by using a corresponding carrier in a running period of a DRX-inactivity timer of any DRX configuration, whether there is data on the physical downlink control channel. Once the terminal device detects the physical downlink control channel and successfully demodulates the first transmitted data belonging to the terminal device, the terminal device starts or restarts a DRX-inactivity timer of another DRX configuration.

In one embodiment, once the terminal device detects the physical downlink control channel and successfully demodulates the first transmitted data belonging to the terminal device, the terminal device may start or restart an inactivity timer corresponding to any one of the M DRX configurations.

For example, the terminal device may select the maximum on duration timer and the minimum DRX cycle by comparing the plurality of DRX configurations, or the terminal device may learn of the maximum on duration timer and the minimum DRX cycle in another manner.

In one embodiment, the terminal device receives the plurality of DRX configurations, and when the DRX status of the terminal device is the active state ON, monitors the physical downlink control channel on the carriers corresponding to the plurality of DRX configurations that are started in an overlay manner, thereby meeting quality of service requirements of different services sent by the terminal device. In addition, the terminal device simultaneously uses the plurality of DRX configurations in an overlay manner, so as to reduce unnecessary physical downlink control channel monitoring in a process of monitoring the physical downlink control channel, thereby reducing energy consumption of the terminal device.

Further, in one embodiment of this application, the network device configures the plurality of DRX configurations based on a first attribute, and all of the plurality of DRX configurations have a same attribute value of the first attribute or similar attribute values of the first attribute. The first attribute may be a service-related attribute.

In addition to the first attribute, the network device may configure DRX based on a second attribute, and the second attribute is a specific attribute other than a service attribute, such as an actual network status, or a capability of a wireless network device. This is not specifically limited in this application.

When the first attribute is the service attribute, the plurality of DRX configurations may be obtained based on a service attribute difference. For example, when the service attribute is a transmission latency requirement, a new radio of a new wireless communications system simultaneously includes an ultra-reliable and low latency communication (Ultra-reliable and Low Latency Communications, URLLC), an enhanced mobile broadband (Enhanced Mobile Broadband, eMBB), and massive machine type communication (Massive Machine Type Communications, mMTC). The URLLC has a relatively strict requirement on latency and reliability, and requires a transmission latency of less than 0.5 ms. However, the eMBB and the mMTC have a relatively low requirement on a transmission latency.

Therefore, when the service attribute is the transmission latency requirement, the network device may configure DRX based on different transmission latency requirements. A shorter DRX cycle, longer activation duration, and the like may be configured for the URLLC. When the service attribute is a data rate requirement, for a high data rate requirement, the network device may configure that DRX corresponds to a relatively large quantity of carriers, and the like.

Further, the network device may determine more priorities based on the service attribute, to determine that the plurality of DRX configurations can be obtained. The service attribute may be a combination of a plurality of different requirements. This is not limited in this application.

The first attribute may be a physical resource attribute or an identifier, namely, a numerology profile, of a physical resource attribute, and the numerology profile is a physical layer resource use attribute of the network device. It should be noted that, for example, when there is a single numerology profile in a 5G application environment, a maximum quantity of subcarriers of each new radio carrier may be 3300 or 6600.

When the first attribute is the physical layer resource use attribute, the network device establishes a correspondence between a plurality of DRX configurations and numerology profiles, determines that each DRX configuration corresponds to one type of numerology profile; and sends, to the terminal device, the plurality of DRX configurations for which a correspondence is established with the numerology profiles. The numerology profile is used to limit another carrier attribute or a quantity of carriers in a group of carriers corresponding to each DRX configuration. For example, the numerology profile herein may specifically include at least one of the following: a resource cycle (for example, the cycle is 1 ms, 2 ms, 5 ms, one TTI length, or two TTI lengths), a transmission time interval (transmission time interval, TTI) length (for example, a TTI of 1 ms, a TTI of 0.5 ms, a TTI length of two OFDM symbols, a TTI length of one OFDM symbol), a subcarrier spacing (for example, 15 KHz or 60 KHz), a coding scheme (for example, whether a turbo code, a low-density parity-check (low-density parity-check, LDPC) code, or a polar polar code is used), a multiple access manner (for example, OFDM, code division multiple access (code division multiple Access, CDMA)), a quantity of carriers occupied in frequency domain (for example, 12 subcarriers or 15 subcarriers), whether to perform a frequency domain retransmission (if the frequency domain retransmission is performed, the numerology profile further includes a quantity of frequency domain retransmissions), and whether to perform a time domain retransmission (if the time domain retransmission is performed, the numerology profile further includes a quantity of time domain retransmissions).

In one embodiment, the network device may further establish a correspondence between each DRX configuration and one group of numerology profiles. The group of numerology profile includes one or more types of numerology profiles.

Figure 6:
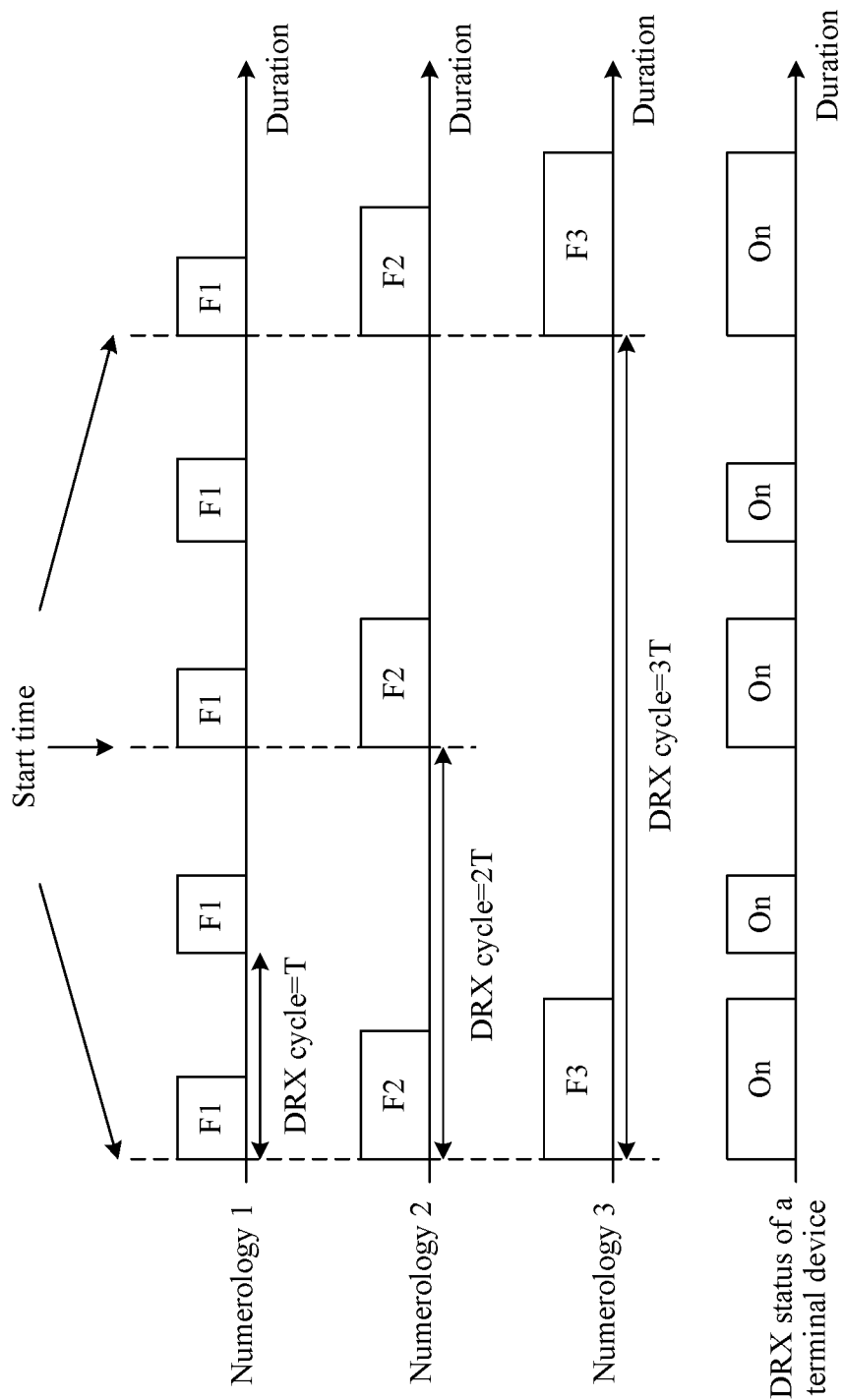
FIG. 6 is a schematic diagram of a process in which a terminal device simultaneously uses, in an overlay manner, three DRX configurations that have a correspondence with numerologies according to an embodiment of this application.

For example, with reference to FIG. 5, FIG. 6 shows a process in which a terminal device simultaneously uses, in an overlay manner, three DRX configurations that have a correspondence with numerology profiles. In FIG. 6, a first DRX configuration corresponds to a numerology 1, a DRX cycle of the first DRX configuration is T, and a running period of an on duration timer of the first DRX configuration is represented by F1. A second DRX configuration corresponds to a numerology 2, a DRX cycle of the second DRX configuration is 2 T, and a running period of an on duration timer of the second DRX configuration is represented by F2. A third DRX configuration corresponds to a numerology 3, a DRX cycle of the third DRX configuration is 3 T, and a running period of an on duration timer of the third DRX configuration is represented by F3. Based on the foregoing description that the DRX status of the terminal device is the active state, in FIG. 6, "ON" is used to mark duration in which the terminal device is in the active state.

It may be understood that the foregoing description of the division manner of the plurality of DRX configurations is merely an example. The network device or an operator may design different division rules according to an actual requirement. This is not limited in this application.

Figure 7:
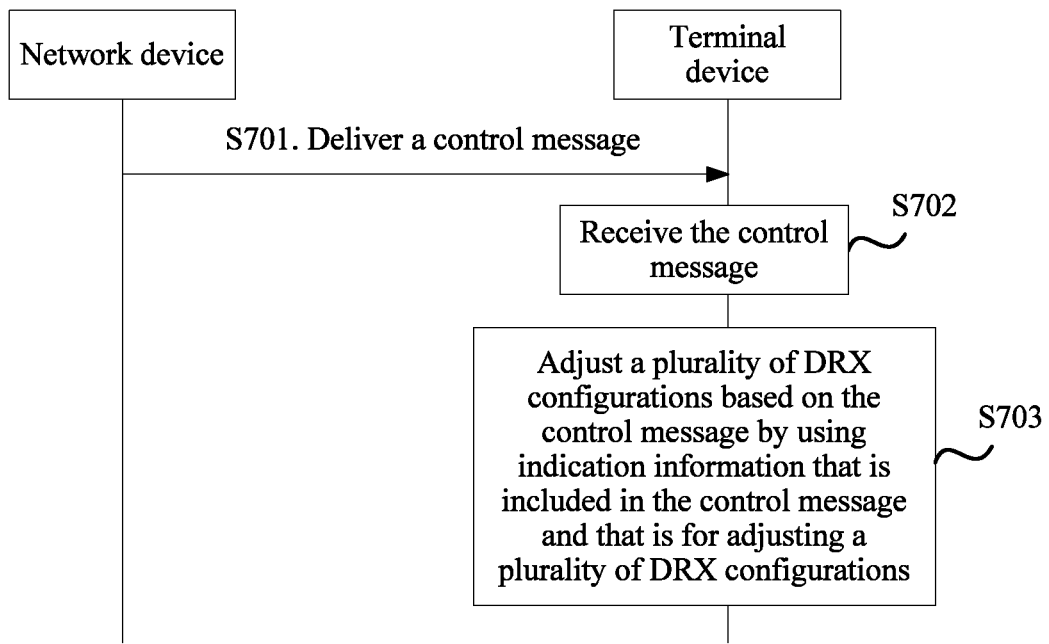
FIG. 7 is a schematic flowchart of another DRX configuration method according to an embodiment of this application.

FIG. 7 is a schematic flowchart of another DRX configuration method according to an embodiment of this application. Based on the DRX configuration method disclosed in the foregoing embodiments of this application, this DRX configuration method includes the following operations.

Operation S701. A network device delivers a control message to a terminal device.

In one embodiment, the control message includes indication information for adjusting a plurality of DRX configurations.

In one embodiment, the control message may be an RRC reconfiguration message, the control message may be a preset downlink control command, or the control message may be a DRX media access control command.

In one embodiment, for the RRC reconfiguration message, when the control message received by the terminal device is the RRC reconfiguration message, if the terminal device meets an activation condition, the terminal device needs to adjust one DRX configuration or N DRX configurations based on the RRC reconfiguration message. Herein, the activation condition met by the terminal device is as follows: One DRX configuration or N DRX configurations currently used by the terminal device in an overlay manner is not applicable to quality of service of a sent service or a to-be-sent new service.

In one embodiment, a correspondence exists between the downlink control command and a group of DRX configurations, and the group of DRX configurations includes one DRX configuration or N DRX configurations.

In one embodiment, for the DRX media access control command, when configuring the N DRX configurations, the network device enables that each DRX configuration corresponds to one type of DRX media access control command indication, and each type of DRX media access control command indication corresponds to one logical channel identifier (logical channel identity, LCD).

In one embodiment, in a 5G-based application environment, the terminal device simultaneously uses the N DRX configurations in an overlay manner. In existing LTE, different values are assigned to long cycle DRX and a DRX command (drx command) in the downlink logical channel identifier, to obtain new logical channel identifiers, and the new logical channel identifiers are used to indicate DRX media access control commands of different DRX configurations.

Operation S702. The terminal device receives the control message sent by the network device.

Operation S703. The terminal device adjusts a plurality of DRX configurations based on the control message by using the indication information that is included in the control message and that is for adjusting a plurality of DRX configurations.

In one embodiment, in a process in which the terminal device simultaneously uses the plurality of DRX configurations in an overlay manner to monitor a physical downlink control channel, if the terminal device receives the control message sent by the network device, the terminal device adjusts one or more of the plurality of DRX configurations by using the indication information for adjusting a plurality of DRX configurations. A manner for this adjustment is activation or deactivation.

For example, FIG. 5 shows the process in which the terminal device simultaneously uses the three DRX configurations in an overlay manner. When the terminal receives the control message sent by the network device, if the indication information that is included in the control message and that is for adjusting a plurality of DRX configurations is instructing the terminal device to deactivate the second DRX configuration that is being used, the terminal device deactivates the second DRX configuration based on the control message, and stops using the second DRX configuration.

In one embodiment, the terminal device receives the control message delivered by the network device, and may perform, based on the indication information that is included in the control message and that is for adjusting a plurality of DRX configurations, activation or deactivation adjustment on one or more of the plurality of DRX configurations that are simultaneously used in an overlay manner, or even the plurality of DRX configurations that are simultaneously used in an overlay manner currently. The terminal device dynamically adjusts the plurality of DRX based on the control message delivered by the network device, so that when a quality of service requirement of a service is increased or a new service is sent, adjustment on the plurality of DRX configurations that are used in an overlay manner can be quickly completed, thereby further meeting quality of service requirements of different services sent by the terminal device. In addition, energy consumption of the terminal device can also be reduced.

Figure 8:
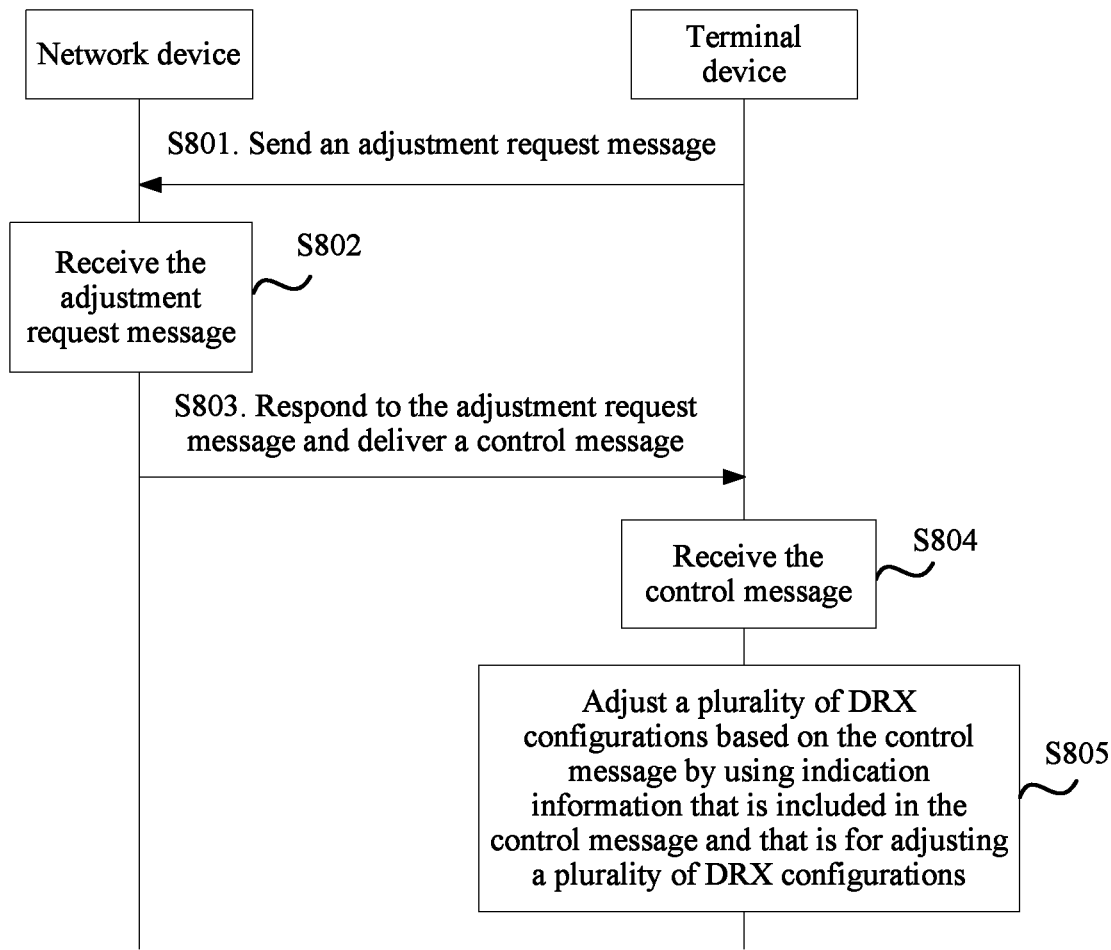
FIG. 8 is a schematic flowchart of another DRX configuration method according to an embodiment of this application.

FIG. 8 is a schematic flowchart of another DRX configuration method according to an embodiment of this application. Based on the DRX configuration method disclosed in the foregoing embodiments of this application, if a terminal device stores a plurality of received DRX configurations, the DRX configuration method includes the following operations.

Operation S801. The terminal device sends an adjustment request message to a network device.

In one embodiment, the adjustment request message includes indication information indicating a DRX configuration that the terminal device requests to adjust.

It may be understood that the terminal device reports, to the network device based on a current service requirement, a DRX configuration that the terminal device wants to adjust or replace.

Operation S802. The network device receives the adjustment request message.

Operation S803. The network device sends a control message to the terminal device based on the adjustment request message.

In one embodiment, the control message is a response message of the adjustment request message, and includes indication information that corresponds to the adjustment request message and that is for adjusting a plurality of DRX configurations. Content limited by the control message in S803 is the same as content limited by the control message described in S702 shown in FIG. 7. For the content of the control message in S803, refer to the content of the control message shown in FIG. 7. Details are not described herein again.

Operation S804. The terminal device receives the control message sent by the network device.

Operation S805. The terminal device adjusts a plurality of DRX configurations based on the control message by using the indication information that is included in the control message and that is for adjusting a plurality of DRX configurations.

In one embodiment, in a process in which the terminal device simultaneously uses the plurality of DRX configurations in an overlay manner to monitor a physical downlink control channel, if the terminal device receives the control message sent by the network device in response to the adjustment request message, the terminal device adjusts one or more of the plurality of DRX configurations by using the indication information for adjusting a plurality of DRX configurations. A manner for this adjustment is activation or deactivation.

For example, the terminal device constantly receives a plurality of DRX configurations sent by the network device. In a process in which the terminal device simultaneously uses the plurality of DRX configurations (at least including using two DRX configurations in an overlay manner) in an overlay manner to monitor a physical downlink control channel, when a new service arrives at the terminal device or a currently running service meets a new quality of service requirement, the terminal device sends the adjustment request message to the network device. The network device responds to the adjustment request message, and sends the control message to the terminal device. The terminal device uses the control message to activate or deactivate one or more of the plurality of DRX configurations that are simultaneously used in an overlay manner currently, and even overwrite, by using a plurality of new DRX configurations, the plurality of DRX configurations that are currently used in an overlay manner, and simultaneously overlay the plurality of new scheduled DRX configurations to monitor the physical downlink control channel.

In one embodiment of this application, the terminal device reports the adjustment request message to the network device based on the service requirement, and performs, based on the control message delivered by the network device in response to the adjustment request message, activation or deactivation adjustment on the one or more of the plurality of DRX configurations that are simultaneously used in an overlay manner, or even the plurality of DRX configurations that are simultaneously used in an overlay manner currently. Therefore, when a quality of service requirement of a service is increased or a new service is sent, adjustment on the plurality of DRX configurations that are used in an overlay manner can be quickly completed, thereby further meeting quality of service requirements of different services sent by the terminal device. In addition, energy consumption of the terminal device can also be reduced.

Based on the DRX configuration method disclosed in the foregoing embodiments of this application, the embodiments of this application further disclose a terminal device and a network device that perform the DRX configuration method. For example, the terminal device may be the terminal device shown in FIG. 3, and the network device may be the network device shown in FIG. 3.

Figure 9:
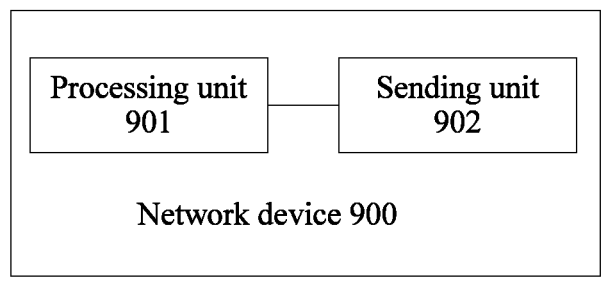
FIG. 9 is a schematic structural diagram of a network device according to an embodiment of this application.

FIG. 9 is a schematic structural diagram of a network device 900 according to an embodiment of this application. The network device 900 includes:

a processing unit 901, configured to configure N DRX configurations, where the N DRX configurations respectively correspond to N groups of carriers, N is an integer greater than or equal to 2, and M groups of carriers in the N groups of carriers are activated carriers; and a sending unit 902, configured to: send the N DRX configurations to the terminal device, and send a physical downlink control channel to the terminal device based on the M DRX configurations by using a specified carrier, where the specified carrier is some groups or all groups of the M groups of carriers, and M is a positive integer less than or equal to N.

In one embodiment, a correspondence between the N DRX configurations and carriers is as follows: The N DRX configurations respectively correspond to the N groups of carriers, that is, each DRX configuration corresponds to one group of carriers. When a DRX status of the terminal device is an active state, if the M groups of carriers in the N groups of carriers are activated carriers, the terminal device monitors a physical downlink control channel on the M groups of carriers based on the M DRX configurations corresponding to the M groups of carriers, where M is a positive integer less than or equal to N.

In one embodiment, the processing unit 901 is configured to configure each DRX configuration that includes at least one of the following parameters, and the parameters include an on duration timer, a DRX cycle, a DRX-inactivity timer, a DRX-retransmission timer, and a DRX start location offset value.

In one embodiment, the processing unit 901 is configured to: configure that DRX cycles in different DRX configurations are integral multiples of a minimum DRX cycle; or configure that a plurality of same DRX start position offset values of the N sets of DRX configurations are the same; or configure that the on duration timer, the DRX-inactivity timer, and the DRX-retransmission timer have different parameter values; or configure that the on duration timer, the DRX-inactivity timer, and the DRX-retransmission timer have a same parameter value.

In one embodiment, the processing unit 901 is further configured to determine a plurality of DRX configurations based on a first attribute, and all of the N DRX configurations have a same attribute value of the first attribute or similar attribute values of the first attribute. The first attribute may be a service-related attribute. The first attribute may be a numerology profile, and the numerology profile is a physical layer resource use attribute of the network device. For specific content of the first attribute, refer to a part related to the first attribute in the DRX configuration method in the foregoing embodiment of this application. Details are not described herein again.

In one embodiment, the processing unit 901 may further configure DRX based on a second attribute, and the second attribute is a particular attribute other than a service attribute, such as an actual network status, or a capability of a wireless network device. This is not specifically limited in this application.

Further, according to one embodiment, the processing unit 901 may further generate a control message. Optionally, the control message may be an RRC reconfiguration message, the control message may be a preset downlink control command, or the control message may be a DRX media access control command. Optionally, a correspondence exists between the downlink control command and a group of DRX configurations, and the group of DRX configurations includes one or more DRX configurations.

Correspondingly, the sending unit 902 sends the control message to the terminal device.

Further, according to one embodiment, the network device 900 includes a receiving unit, and the receiving unit is configured to receive an adjustment request message reported by the terminal device. The adjustment request message includes indication information indicating a DRX configuration that the terminal device requests to adjust.

Correspondingly, the processing unit 901 is configured to respond to the adjustment request message and generate a corresponding control message.

Correspondingly, the sending unit 902 is configured to send the control message to the terminal device.

For corresponding operations of the units in the network device disclosed in this embodiment of this application, refer to corresponding operations performed by the network devices in FIG. 4, FIG. 7, and FIG. 8 in the embodiments of this application. Details are not described herein again.

With reference to the DRX configuration method disclosed in the embodiments of this application, the network device disclosed in this embodiment of this application may alternatively be directly implemented by using hardware, a memory performed by a processor, or a combination thereof.

Figure 10:
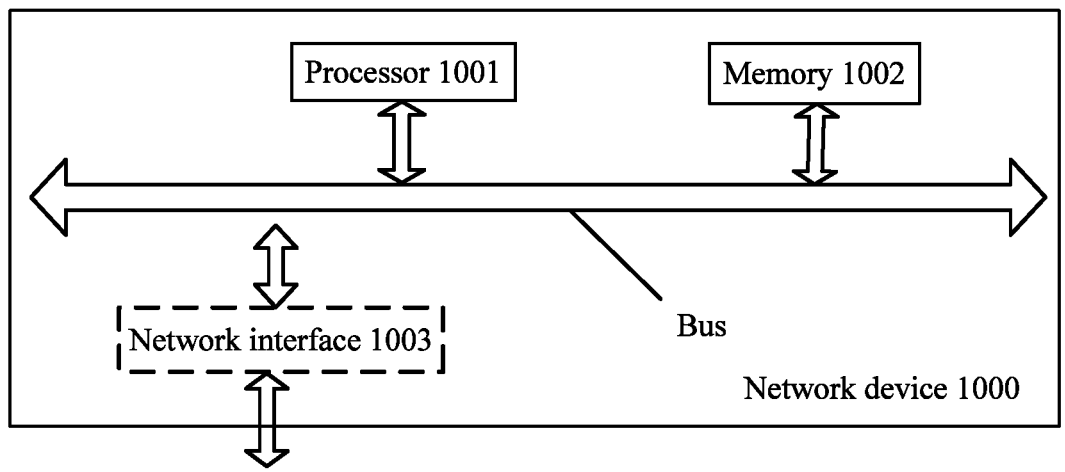
FIG. 10 is a schematic structural diagram of another network device according to an embodiment of this application.

As shown in FIG. 10, the network device 1000 includes a processor 1001 and a memory 1002. In one embodiment, the network device 1000 further includes a network interface 1003.

The processor 1001 is coupled to the memory 1002 through a bus. The processor 1002 is coupled to the network interface 1003 through the bus.

The processor 1001 may be a central processing unit (CPU), a network processor (NP), an application-specific integrated circuit (ASIC), or a programmable logic device (PLD). The PLD may be a complex programmable logic device (CPLD), a field-programmable gate array (FPGA), or generic array logic (GAL).

The memory 1002 may be specifically a content-addressable memory (content-addressable memory, CAM) or a random access memory (RAM). The CAM may be a ternary content-addressable memory (TCAM).

The network interface 1003 may be a wired interface, for example, a fiber distributed data interface (FDDI) or an ethernet interface.

The memory 1002 may be alternatively integrated in the processor 1001. If the memory 1002 and the processor 1001 are devices independent of each other, the memory 1002 and the processor 1001 are connected to each other, for example, the memory 1002 and the processor 1001 may communicate with each other through the bus. The network interface 1003 and the processor 1001 may communicate with each other through the bus, or the network interface 1003 may be directly connected to the processor 1001.

The memory 1002 is configured to store an operation program, code, or an instruction used for processing a DRX configuration. Optionally, the memory 1002 includes an operating system and an application program, and is configured to store the operation program, the code, or the instruction used for processing the DRX configuration.

When the processor 1001 or a hardware device needs to perform a DRX configuration-related operation, the processor 1001 or the hardware device may invoke and execute the operation program, the code, or the instruction stored in the memory 1002, to complete the DRX configuration processes performed by the network devices in FIG. 4, FIG. 7, and FIG. 8. For a specific process, refer to a corresponding part in the foregoing embodiment of this application. Details are not described herein again.

It may be understood that FIG. 10 merely shows a simplified design of the network device. In actual application, the network device may include any quantity of interfaces, processors, memories, and the like, and all network devices that can implement the embodiments of this application fall within a protection scope of the embodiments of this application.

Based on the DRX configuration method disclosed in the embodiments of this application, an embodiment of this application further discloses a terminal device that performs the DRX configuration method. The terminal device communicates with the network device shown in FIG. 9 in the embodiment of this application by using a radio signal.

Figure 11:
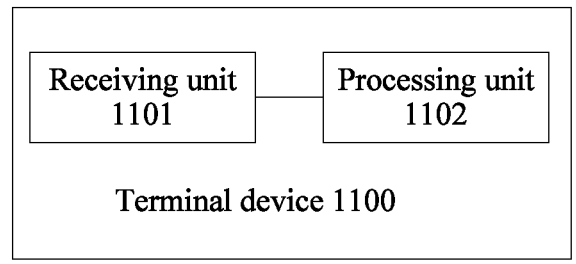
FIG. 11 is a schematic structural diagram of a terminal device according to an embodiment of this application.

FIG. 11 is a schematic structural diagram of a terminal device 1100 according to an embodiment of this application. The terminal device 1100 includes a receiving unit 1101 and a processing unit 1102.

The receiving unit 1101 is configured to receive N DRX configurations sent by a network device, where the N DRX configurations respectively correspond to N groups of carriers, and N is an integer greater than or equal to 2.

In one embodiment, the receiving unit 1101 receives the plurality of DRX configurations sent by the network device. The DRX configuration includes at least one of the following parameters, and the parameters include an on duration timer, a DRX cycle, a DRX-inactivity timer, a DRX-retransmission timer, and a DRX start location offset value.

The processing unit 1102 is configured to: when a DRX status of the terminal device is an active state, if M groups of carriers in the N groups of carriers are activated carriers, monitor a physical downlink control channel on a specified carrier based on M DRX configurations corresponding to the M groups of carriers, where the specified carrier is some groups or all groups of the M groups of carriers, and M is a positive integer less than or equal to N.

In one embodiment, the processing unit 1102 is further configured to determine the DRX status of the terminal device 1100, and the DRX status includes the active state or an inactive state. If any one of the on duration timer, the DRX-inactivity timer, and the DRX-retransmission timer is in a running state, it is determined that the DRX status of the terminal device 1100 is the active state.

In one embodiment, when the DRX status of the terminal device is the active state, the processing unit 1102 uses the M DRX configurations in an overlay manner.

In one embodiment, when the processing unit 1102 monitors the physical downlink control channel on carriers corresponding to the plurality of DRX configurations, the processing unit 1102 is specifically configured to: determine a maximum on duration timer and a minimum DRX cycle from the M DRX configurations; and in running periods of the maximum on duration timer and the minimum DRX cycle, when it is detected, on a corresponding carrier in a running period of a DRX-inactivity timer of any one of the DRX configurations, that there is downlink data on a physical downlink control channel, starts a DRX-inactivity timer of another DRX configuration.

Further, according to one embodiment, the receiving unit 1101 is further configured to receive a control message delivered by the network device. The control message includes indication information for adjusting a plurality of DRX configurations.

In one embodiment, the control message may be an RRC reconfiguration message, the control message may be a preset downlink control command, or the control message may be a DRX media access control command.

Correspondingly, the processing unit 1102 is configured to adjust the plurality of DRX configurations based on the control message by using the indication information that is included in the control message and that is for adjusting a plurality of DRX configurations.

Further, optionally, the processing unit 1102 in the terminal device 1100 is further configured to: generate an adjustment request message based on a current service requirement, and adjust the plurality of discontinuous reception DRX configurations based on the control message delivered by the network device and by using the indication information that is included in the control message and that is for adjusting a plurality of DRX configurations. The adjustment request message includes indication information indicating a DRX configuration that the terminal device requests to adjust.

Correspondingly, a sending unit included in the terminal device 1100 sends the adjustment request message to the network device.

Correspondingly, the receiving unit 1101 is further configured to receive the control message that is delivered by the network device in response to the adjustment request message.

For corresponding operations of the units in the terminal device disclosed in this embodiment of this application, refer to corresponding operations performed by the terminal devices in FIG. 4, FIG. 7, and FIG. 8 in the embodiments of this application. Details are not described herein again.

Figure 12:
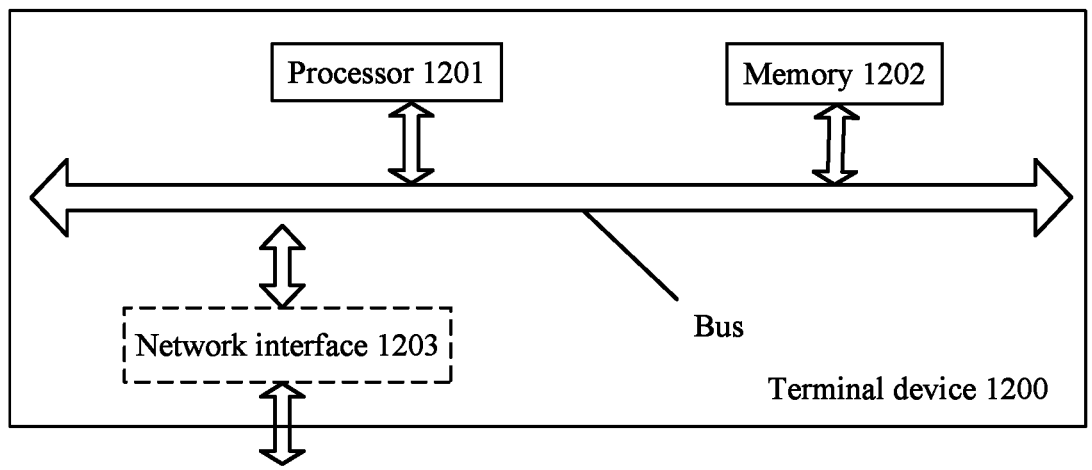
FIG. 12 is a schematic structural diagram of another terminal device according to an embodiment of this application.

As shown in FIG. 12, the terminal device 1200 includes a processor 1201 and a memory 1202. Optionally, the terminal device 1200 further includes a network interface 1203.

The processor 1201 is coupled to the memory 1202 through a bus. The processor 1202 is coupled to the network interface 1203 through the bus.

The processor 1201 may be specifically a central processing unit (CPU), a network processor (NP), an application-specific integrated circuit (ASIC), or a programmable logic device (PLD). The PLD may be a complex programmable logic device (CPLD), a field-programmable gate array (FPGA), or generic array logic (GAL).

The memory 1202 may be specifically a content-addressable memory (CAM) or a random access memory (RAM). The CAM may be a ternary content-addressable memory (TCAM).

The network interface 1203 may be a wired interface or an ethernet interface.

The memory 1202 may be alternatively integrated in the processor 1201. If the memory 1202 and the processor 1201 are devices independent of each other, the memory 1202 and the processor 1201 are connected to each other, for example, the memory 1202 and the processor 1201 may communicate with each other through the bus. The network interface 1203 and the processor 1201 may communicate with each other through the bus, or the network interface 1203 may be directly connected to the processor 1201.

The memory 1202 is configured to store an operation program, code, or an instruction used for processing a DRX configuration. Optionally, the memory 1202 includes an operating system and an application program, and is configured to store the operation program, the code, or the instruction used for processing the DRX configuration.

When the processor 1201 or a hardware device needs to perform a DRX configuration-related operation, the processor 1201 or the hardware device may invoke and execute the operation program, the code, or the instruction stored in the memory 1202, to complete the DRX configuration processes performed by the terminal devices in FIG. 4, FIG. 7, and FIG. 8. For a specific process, refer to a corresponding part in the foregoing embodiment of this application. Details are not described herein again.

It may be understood that FIG. 12 merely shows a simplified design of the terminal device. In actual application, the terminal device may include any quantity of interfaces, processors, memories, and the like, and all terminal devices that can implement the embodiments of this application fall within a protection scope of the embodiments of this application.

Figure 13:
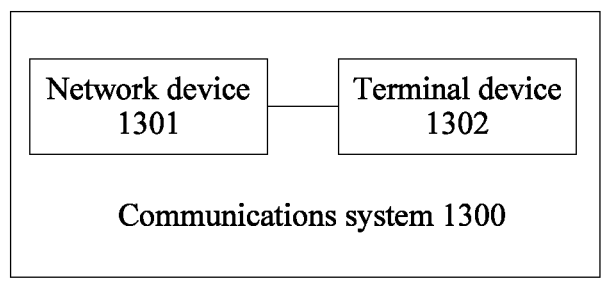
FIG. 13 is a schematic structural diagram of a communications system according to an embodiment of this application.

FIG. 13 is a communications system 1300 according to an embodiment of this application. The communications system 1300 includes a network device 1301 and a terminal device 1302. The network device 1301 and the terminal device 1302 communicate with each other by using a radio signal.

The network device 1301 is configured to: configure a plurality of DRX configurations, send the plurality of DRX configurations to the terminal device 1302, and actively send a control message to the terminal device 1302, or generate and send a control message to the terminal device 1302 in response to an adjustment request message reported by the terminal device 1302.

The terminal device 1302 is configured to: receive the plurality of DRX configurations sent by the network device 1301; when a DRX status is an active state, monitor a physical downlink control channel on carriers corresponding to the plurality of enabled/activated DRX configurations; and adjust the plurality of DRX configurations based on the control message actively delivered by the network device 1301; or send the adjustment request message to the network device 1301 based on a current service requirement, and adjust the plurality of DRX configurations based on the control message delivered by the network device 1301 in response to the adjustment request message.

In the communications system disclosed in the foregoing embodiment of this application, quantities of network devices 1301 and terminal devices 1302 are not limited. The network device 1301 may be specifically each of the network devices disclosed in FIG. 9 and FIG. 10, and is configured to perform corresponding operations performed by the network devices in FIG. 4, FIG. 7, and FIG. 8 in the embodiments of this application. The terminal device 1302 may be specifically each of the terminal devices disclosed in FIG. 11 and FIG. 12, and is configured to perform corresponding operations performed by the terminal devices in FIG. 4, FIG. 7, and FIG. 8 in the embodiments of this application. For a specific process and an execution principle, refer to the foregoing descriptions. Details are not described herein again.

Persons skilled in the art should be aware that in the foregoing one or more examples, functions described in this application may be implemented by hardware, software, firmware, or any combination thereof. When software is used to implement the functions, the foregoing functions may be stored in a computer-readable medium or transmitted as one or more instructions or code in the computer-readable medium. The computer-readable medium includes a computer storage medium and a communications medium, where the communications medium includes any medium that enables a computer program to be transmitted from one place to another place. The storage medium may be any available medium accessible to a general-purpose or dedicated computer.

The parts in this specification are all described in a progressive manner. For same or similar parts in the embodiments, refer to these embodiments. Each embodiment focuses on a difference from other embodiments. Especially, apparatus and system embodiments are basically similar to a method embodiment, and therefore are described briefly. For related parts, refer to descriptions in the method embodiment.

Finally, it should be noted that the foregoing embodiments are merely intended for describing examples of the technical solutions of this application other than limiting this application. Although this application and benefits of this application are described in detail with reference to the foregoing embodiments, persons of ordinary skill in the art should understand that they may still make modifications to the technical solutions described in the foregoing embodiments or make equivalent replacements to some technical features thereof, without departing from the scope of the claims of this application.

What is claimed is:

1. A discontinuous reception (DRX) configuration method, comprising:
   receiving, by a terminal device, N discontinuous reception (DRX) configurations sent by a network device, wherein the N DRX configurations respectively correspond to N groups of carriers, and N is an integer greater than or equal to 2; and
   when a DRX status of the terminal device is an active state, and M groups of carriers in the N groups of carriers are activated carriers, monitoring, by the terminal device, a physical downlink control channel on the M groups of carriers based on M DRX configurations corresponding to the M groups of carriers, wherein M is a positive integer less than or equal to N, wherein the M DRX configurations are used simultaneously in an overlay manner.

2. The method according to claim 1, wherein DRX cycles in different DRX configurations are different integral multiples of a minimum DRX cycle, and the minimum DRX cycle is preset; and/or
   a plurality of DRX start location offset values of the N DRX configurations are the same; and/or
   an on duration timer, a DRX-inactivity timer, and a DRX-retransmission timer in each DRX configuration have different parameter values.

3. The method according to claim 1, wherein a DRX configuration comprises a timer, and the timer comprises at least one of an on duration timer, an DRX-inactivity timer, an DRX-retransmission timer, and a DRX-uplink retransmission timer;
   the DRX status of the terminal device comprises the active state or an inactive state; and
   when any timer comprised in any one of the M DRX configurations is in a running state, the DRX status of the terminal device is the active state.

4. The method according to claim 1, wherein a parameter configured in each DRX configuration comprises at least one of the following items: an on duration timer, a DRX cycle, a DRX-inactivity timer, a DRX-retransmission timer, a DRX-uplink retransmission timer, and a DRX start location offset value.

5. The method according to claim 1, wherein the monitoring, by the terminal device, a physical downlink control channel on the M groups of carriers based on M DRX configurations corresponding to the M groups of carriers comprises:
   in a running period of an inactivity timer of any one of the M DRX configurations, when it is detected, on a carrier corresponding to any one of the M DRX configurations, that there is first transmitted data on the physical downlink control channel, starting or restarting an inactivity timer of another DRX configuration, or starting or restarting an inactivity timer corresponding to any one of the M DRX configurations.

6. The method according to claim 1, wherein:
   the N DRX configurations correspond to a same physical resource use attribute or different physical resource use attributes, and the physical resource use attribute is related to any timer in the N DRX configurations or a quantity of carriers in a group of carriers corresponding to each of the N DRX configurations; and
   the physical resource use attribute comprises at least one of the following items: a resource cycle, a transmission time interval, a subcarrier spacing, and a coding scheme.

7. The method according to claim 1, before the receiving, by a terminal device, N DRX configurations sent by a network device, further comprising:
   sending, by the terminal device, indication information to an access network device, wherein the indication information is used to indicate whether the terminal device supports receiving of a plurality of DRX configurations.

8. A terminal device, comprising:
   a processor;
   a memory coupled to the processor and storing program instructions, which when executed by the processor, cause the processor to perform operations comprising:
   receiving N discontinuous reception (DRX) configurations sent by a network device, wherein the N DRX configurations respectively correspond to N groups of carriers, and N is an integer greater than or equal to 2; and
   when a DRX status of the terminal device is an active state, and M groups of carriers in the N groups of carriers are activated carriers, monitoring a physical downlink control channel on a carrier based on M DRX configurations corresponding to the M groups of carriers, wherein M is a positive integer less than or equal to N, wherein the M DRX configurations are used simultaneously in an overlay manner.

9. The terminal device according to claim 8, wherein the processor is configured to: when the DRX status of the terminal device is the active state, use the M DRX configurations in an overlay manner.

10. The terminal device according to claim 8, wherein the processor is configured to receive the N DRX configurations sent by the network device, wherein DRX cycles in different DRX configurations are different integral multiples of a minimum DRX cycle, the minimum DRX cycle is preset; and/or a plurality of DRX start location offset values of the N DRX configurations are the same; and/or an on duration timer, a DRX-inactivity timer, and a DRX-retransmission timer in each DRX configuration have different parameter values.

11. The terminal device according to claim 8, wherein the processor is configured to receive the N DRX configurations sent by the network device, a DRX configuration comprises a timer, and the timer comprises at least one of an on duration timer, a DRX-inactivity timer, a DRX-retransmission timer, and a DRX-uplink retransmission timer; and correspondingly the processor is further configured to determine the DRX status of the terminal device, wherein the DRX status of the terminal device comprises the active state or an inactive state; and when any timer comprised in any one of the M DRX configurations is in a running state, the DRX status of the terminal device is the active state.

12. The terminal device according to claim 8, wherein the processor is configured to receive the N DRX configurations sent by the network device, a parameter configured in each DRX configuration comprises at least one of the following items: an on duration timer, a DRX cycle, a DRX-inactivity timer, a DRX-retransmission timer, a DRX-uplink retransmission timer, and a DRX start location offset value.

13. The terminal device according to claim 8, wherein the processor that monitors the physical downlink control channel on the M groups of carriers based on the M DRX configurations corresponding to the M groups of carriers further include the operations: in a running period of an inactivity timer in any one of the M DRX configurations, when it is detected, on a carrier corresponding to any one of the M DRX configurations, that there is first transmitted data on the physical downlink control channel, start or restart an inactivity timer of another DRX configuration, or start or restart an inactivity timer corresponding to any one of the M DRX configurations.

14. The terminal device according to claim 8, wherein the processor is further configured to receive the N DRX configurations sent by the network device, wherein the N DRX configurations correspond to a same physical resource use attribute or different physical resource use attributes, the physical resource use attribute is related to any timer in the N DRX configurations or a quantity of carriers in a group of carriers corresponding to each of the N DRX configurations, and the physical resource use attribute comprises at least one of the following items: a resource cycle, a transmission time interval, a subcarrier spacing, and a coding scheme.

15. A non-transitory computer-readable medium having instructions stored therein, which when executed by a processor, cause the processor to perform operations, the operations comprising:

receiving, by a terminal device, N discontinuous reception (DRX) configurations sent by a network device, wherein the N DRX configurations respectively correspond to N groups of carriers, and N is an integer greater than or equal to 2; and when a DRX status of the terminal device is an active state, when M groups of carriers in the N groups of carriers are activated carriers, monitoring, by the terminal device, a physical downlink control channel on the M groups of carriers based on M DRX configurations corresponding to the M groups of carriers, wherein M is a positive integer less than or equal to N, wherein the M DRX configurations are used simultaneously in an overlay manner.

16. The non-transitory computer-readable medium according to claim 15, wherein DRX cycles in different DRX configurations are different integral multiples of a minimum DRX cycle, and the minimum DRX cycle is preset; and/or a plurality of DRX start location offset values of the N DRX configurations are the same; and/or an on duration timer, a DRX-inactivity timer, and a DRX-retransmission timer in each DRX configuration have different parameter values.

17. The non-transitory computer-readable medium according to claim 15, wherein a DRX configuration comprises a timer, and the timer comprises at least one of an on duration timer, a DRX-inactivity timer, a DRX-retransmission timer, and a DRX-uplink retransmission timer;

the DRX status of the terminal device comprises the active state or an inactive state; and when any timer comprised in any one of the M DRX configurations is in a running state, the DRX status of the terminal device is the active state.

18. The non-transitory computer-readable medium according to claim 15, wherein a parameter configured in each DRX configuration comprises at least one of the following items: an on duration timer, a DRX cycle, a DRX-inactivity timer, a DRX-retransmission timer, a DRX-uplink retransmission timer, and a DRX start location offset value.

* * * * *